(12) United States Patent
Semons et al.

(10) Patent No.: US 10,617,104 B2
(45) Date of Patent: Apr. 14, 2020

(54) FLY REEL WITH TOOL FREE CHANNEL LOCKING DRAG SYSTEM

(71) Applicants: Mark S. Semons, Pocatello, ID (US); Jacob S. Semons, Pocatello, ID (US); Dominic S. Aiello, Denver, CO (US)

(72) Inventors: Mark S. Semons, Pocatello, ID (US); Jacob S. Semons, Pocatello, ID (US); Dominic S. Aiello, Denver, CO (US)

(73) Assignee: Mark S. Semons, Pocatello, ID (US)

( * ) Notice: Subject to any disclaimer, the term of this patent is extended or adjusted under 35 U.S.C. 154(b) by 141 days.

(21) Appl. No.: 15/815,953

(22) Filed: Nov. 17, 2017

(65) Prior Publication Data

US 2019/0150417 A1    May 23, 2019

(51) Int. Cl.
*A01K 89/01* (2006.01)
*A01K 89/033* (2006.01)
*A01K 89/016* (2006.01)
*A01K 89/015* (2006.01)

(52) U.S. Cl.
CPC .......... *A01K 89/033* (2013.01); *A01K 89/016* (2013.01); *A01K 89/01921* (2015.05); *A01K 89/01931* (2015.05)

(58) Field of Classification Search
CPC ............ A01K 89/016; A01K 89/01921; A01K 89/01931; A01K 89/05; A01K 89/058
See application file for complete search history.

(56) References Cited

U.S. PATENT DOCUMENTS

| | | | | |
|---|---|---|---|---|
| 5,615,840 A * | 4/1997 | Bushnell | ............... | A01K 89/033 242/301 |
| 5,915,639 A | 6/1999 | Farris | | |
| 5,921,492 A | 7/1999 | Bauer | | |
| 6,053,445 A | 4/2000 | Farris | | |
| 6,155,508 A | 12/2000 | Lepage | | |
| 6,267,312 B1 | 7/2001 | Farris | | |
| 6,296,200 B1 * | 10/2001 | Chang | .................. | A01K 89/016 242/317 |
| 6,382,544 B1 * | 5/2002 | Park | ..................... | A01K 89/016 242/303 |
| 6,513,743 B1 | 2/2003 | Perkins | | |
| 7,168,647 B1 * | 1/2007 | Kang | .................. | A01K 89/033 242/303 |
| 7,832,673 B2 * | 11/2010 | Lee | ........................ | A01K 89/05 242/317 |

(Continued)

FOREIGN PATENT DOCUMENTS

KR    2010/0025513 A1    2/2010

*Primary Examiner* — Emmanuel M Marcelo

(57) ABSTRACT

A fly-fishing reel comprised of a spool assembly, frame assembly, and drag knob assembly, wherein the drag knob assembly may be removed without the use of tools in order to access the drag components and is attached without the use of fasteners. Drag components are contained between the frame and drag knob assemblies and are accessed by removing the drag knob assembly via a channel locking system. Accessing the drag components allows the user to switch the direction of retrieve and allows a secondary means of altering the range and characteristics of the drag settings. The drag system is sealed via two points on each open end of the drag housing portion of the frame, allowing for minimal maintenance and increased reliability of the drag system.

2 Claims, 9 Drawing Sheets

(56) References Cited

U.S. PATENT DOCUMENTS

| | | | |
|---|---|---|---|
| 8,308,097 B2* | 11/2012 | Hyun | A01K 89/0179 |
| | | | 242/296 |
| 8,651,410 B2* | 2/2014 | Park | A01K 89/05 |
| | | | 242/317 |
| 9,554,565 B2* | 1/2017 | Koelewyn | A01K 89/016 |

* cited by examiner

FLY REEL WITH TOOL FREE CHANNEL LOCKING DRAG SYSTEM

FIELD OF INVENTION

The present invention relates to fishing reels, more specifically to the drag system assembly of a fly-fishing reel.

BACKGROUND OF INVENTION

The design, manufacture, and sale of fly-fishing equipment accounts for a large portion and rapidly growing niche in the sport fishing industry. The fly reel market segment alone consists of a number of manufacturers and brands. Manufacturers of fly-fishing reels are continually searching out methods to increase performance in terms of the rate of line retrieval, decreased weight, durability, braking ability, adjustability, and ease of use.

Fly-fishing reels should allow ample line retrieval for the targeted game species. A large arbor design is preferable and functional in that it allows for an increased rate of retrieval compared to smaller arbor designs. A large arbor also allows for decreased weight relative to size. Previous designs featuring a large arbor design similar to the current invention include U.S. Pat. Nos. 5,915,639 A, 6,053,445 A, 6,267,312 B1, 5,921,492 A, 6,155,508 A, and 6,513,743 B1.

There are two distinct types of fly reel drag systems available on the market at the time being. The first are un-sealed drag systems, which allow for water and elements to enter the braking system and require regular maintenance in order to maintain functionality. The second are typically more complex sealed systems with a higher number of smaller parts, fastening components, drag components, and sealing components, etc. Sealed systems allow for lower maintenance, more consistent performance, and increased durability by protecting the internal drag components from the environment. However, previous sealed system designs have been difficult to access and maintain should the need arise.

All components in drag systems must be contained within the reel in some fashion, and as increased pressure is applied to these various drag components they must effectively apply increased braking force to the line exiting the fly reel and allow for the reel to spool freely as line is retrieved. Users must be capable of switching the direction of retrieve in order to reel either left or right handed, and several prior designs including U.S. Pat. No. 5,915,639 A, 6,053,445 A, 6,267,312 B1, 7,168,647 B1, and 2010/0025513 A1 are known to utilize a type of unidirectional bearing in the drag system which can be removed, flipped, and re-inserted in order to change direction of retrieval, similar to the present invention. However, in order to access the internal drag components in previous designs, several complex steps and tools are required. This creates the potential for losing or damaging small parts while accessing the drag system.

SUMMARY OF THE INVENTION

The present invention is a modern large arbor fly reel featuring a sealed drag system, which allows for greater reliability and functionality in comparison to previous designs due to a lower total parts count. Tool free access to the entire drag system allows for the user to switch the direction of retrieve and offers a secondary means of adjustment by interchanging the drag components. The low total parts count also allows for decreased physical weight in comparison to prior designs, and when the need arises to access the drag system the user may simply release it from the rest of the reel assembly.

The unique design of the reel frame and drag knob allow for both tool-less assembly and user access through utilizing tabular features and a track system. This allows for the drag knob to effectively attach to the frame, containing and enabling the drag components to function within the frame. Whereas previous designs contain the majority of drag components between the spool assembly and the frame assembly, the components of the drag system of the present invention are located entirely between the frame assembly and drag knob assembly, opposite the spool. The channel locking design allows radial movement of the drag knob without risk of detachment during use. When attached, the drag knob effectively contains, seals, and applies varying amounts of pressure to the drag system components dependent on the amount of degrees in which it is rotated from the point of attachment. The present drag system possesses the benefits of being fully enclosed and sealed, allowing for minimal maintenance, and eliminating the need for tools in the assembly process or when adjusting the reel. Unlike previous fly reels, the user may easily access the drag components and make secondary adjustments to the drag system without the use of tools. Many users may desire to either switch the retrieve of the reel from right or left hand retrieve, and/or to add, remove, clean or interchange the components of the drag system in order to alter the characteristics of the drag system. Each of the aforementioned may be achieved by removing the drag knob via the channel locking system. This drag system design allows a virtually infinite range of drag settings achievable, tool free access, a sealed design, and a lower physical weight due to the low total parts count.

All of the drag components are free floating, interchangeable, and are inserted individually into the drag compartment portion of the frame upon assembly of the fly reel. This allows for specific and or interchangeable components to be used for individual reel size configurations. For example, larger fly reels are expected to handle larger game fish species and as such require a high amount of total braking force. Lighter and smaller reels require less maximum braking force but are expected to have a finer range of adjustability between minimum and maximum drag in order to protect light strength fishing lines. The disclosed design allows for the drag system to be specifically tuned to the respective size of reel and share the majority of components, machining steps, manufacturing processes, etc. throughout the size range of reels. Primarily, the density of the silicone drag spring may be interchanged in order to achieve a different drag range within different sizes of reels. Lighter density drag springs are used in the smaller sizes of reels, resulting in a lower maximum drag force achievable and increased fine range adjustability, while a higher density silicone drag spring is used in the larger sizes of reel, resulting in a wider range between minimum and maximum drag force and a much stronger braking system.

Once the individual drag components are inserted into the frame of the reel they are then enclosed and sealed as the self-locking drag knob assembly is attached. In order for the present design to function, the drag knob assembly may only be removed and reattached from the frame of the reel at a singular point in it's rotation. With the drag knob assembly removed, adjustments that may be made include but are not limited to flipping the unidirectional bearing to switch the direction of retrieve, add or removing brake discs as a means to alter the drag range and friction coefficients, interchange the density of silicone drag springs in order to change the overall drag range, and or rotate the pressure plate in or out from its seated position as a secondary means of drag adjustment, which when rotated out from it's seated position increases both the minimum and maximum amount of drag force the reel is capable of producing while using a single density drag spring.

The pressure plate is threaded and fitted to the drag knob screw located on the inside center of the drag knob. As the drag knob rotates through it's glide channel the pressure plate applies increasing compression to the silicone drag spring, increasing the pressure and friction applied to the various surfaces of the braking system. This effectively increases the drag force transmitted through the reel assembly to the line exiting the reel.

The drag setting is radially adjustable via rotating the drag knob, increasing the pressure applied to the drag components when rotated in a clockwise direction or decreased by rotating the drag knob in a counter clockwise direction. The drag ranges from a minimum to maximum setting within a roughly 350 degree rotation. The drag spring serves two purposes. The primary purpose of the drag spring is to gradually increase pressure on the drag components as engagement of the pressure plate is increased on the drag spring. The secondary purpose of the drag spring is to apply backpressure to the drag knob while the drag knob is attached, ensuring that the drag knob the tabular locking features do not escape the track system without manual engagement and rotation. Once the drag knob has been rotated to minimum drag the primary tab feature hits a hard stop feature and the drag knob may no longer rotate in the counter clockwise direction. At this point the drag spring has reached full decompression, and may facilitate the release of the drag knob. At the minimum drag setting the tabular features align with the release channels, and with manual pressure applied the drag knob the drag knob spring is compressed, and allows for the tabular features to be pushed out of the rotary channel and into their corresponding compression channels. Once pressed into the compression channels the drag may be rotated slightly in the counter clockwise direction until the tabular features align with the release channels. At this point the drag knob assembly may be released from the reel assembly. The varying size and shape of the tabular features, compression channels and release channels allow for a single release point within a 360 degree rotation at which the drag knob may be removed.

This unique channel locking design allows for the drag knob to rotate smoothly and independently from the frame, withstanding the backpressure transmitted to the pressure plate as the drag spring is compressed. This design is exemplary in comparison to previous designs in that the drag system is located between the frame and the drag knob, opposite the spool. Previous designs contain the drag system on the opposite side of the frame, meaning the spool must be removed before the drag system may be accessed. Further understanding of the objects and advantages of this design will become apparent through the drawings and their description.

BRIEF DESCRIPTION OF THE DRAWINGS

The invention may take physical form in certain parts and arrangements of parts, a preferred embodiment of which will be described in detail and which is illustrated in the accompanying drawings, wherein.

DETAILED DESCRIPTION OF THE PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses alternatives, modifications and equivalents. Numerous specific details are provided in the following description in order to provide a thorough understanding of the invention. However, the invention may be practiced according to the claims without some or all of these specific details.

Figure 1:
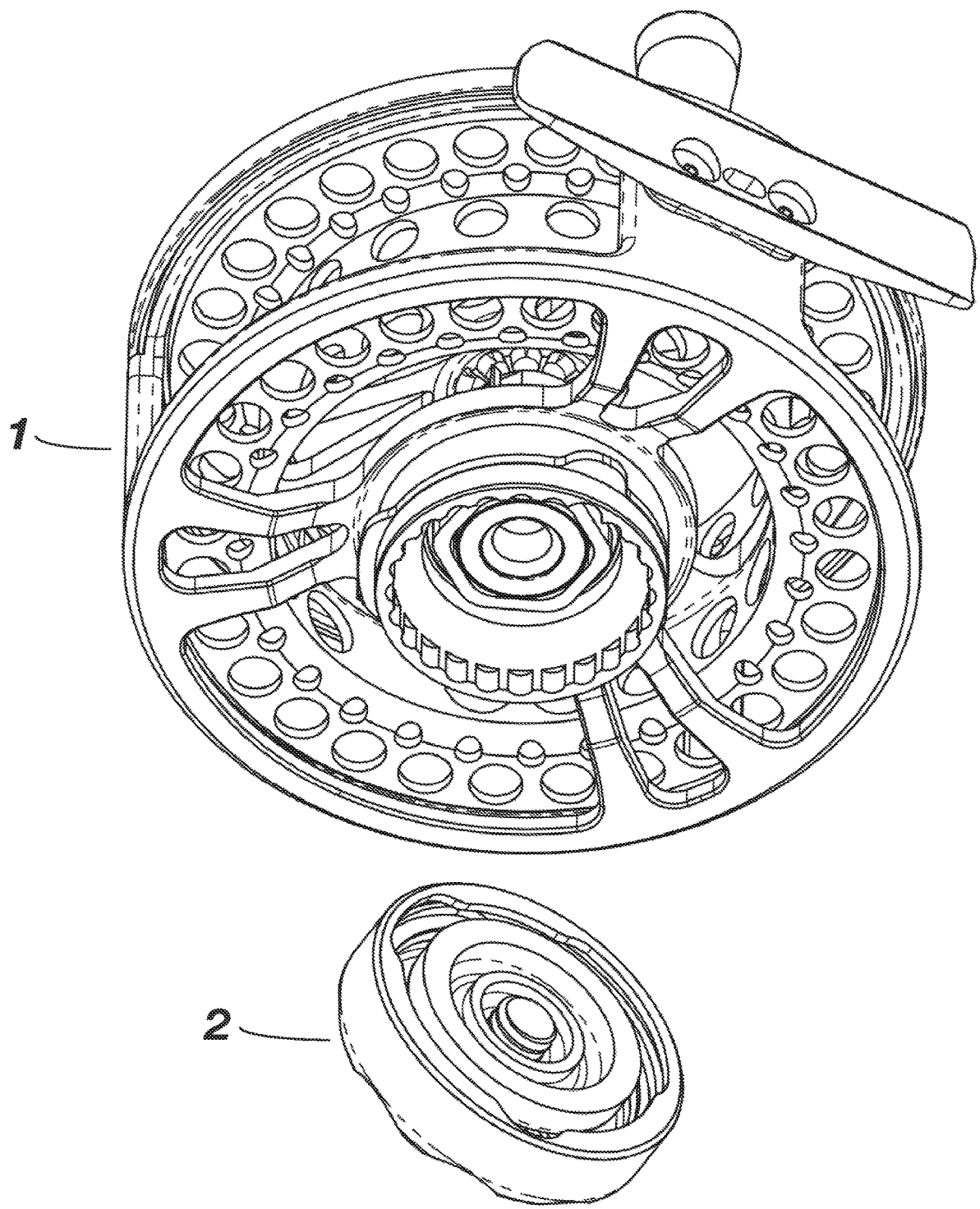
FIG. 1. Is a view of the drag knob assembly detached from the reel assembly. Depicted is the reel assembly 1 and drag knob assembly 2.

Referring to the drawings, FIG. 1. represents a fly fishing reel according to the first preferred embodiment of the present invention. In FIG. 1, the drag knob assembly 2 is removed from the reel assembly 1 exposing the drag components FIG. 3A. FIGS. 4-7 show in detail the specific features of the frame 15 and drag knob 28 that enable the first preferred embodiment. The first preferred embodiment of the present invention is tool free design and assembly of the drag system in its' entirety, which allows for tool free access to the all inner components of the drag system via removal of the drag knob assembly FIG. 3B. from the reel assembly 1.

Figure 2A:
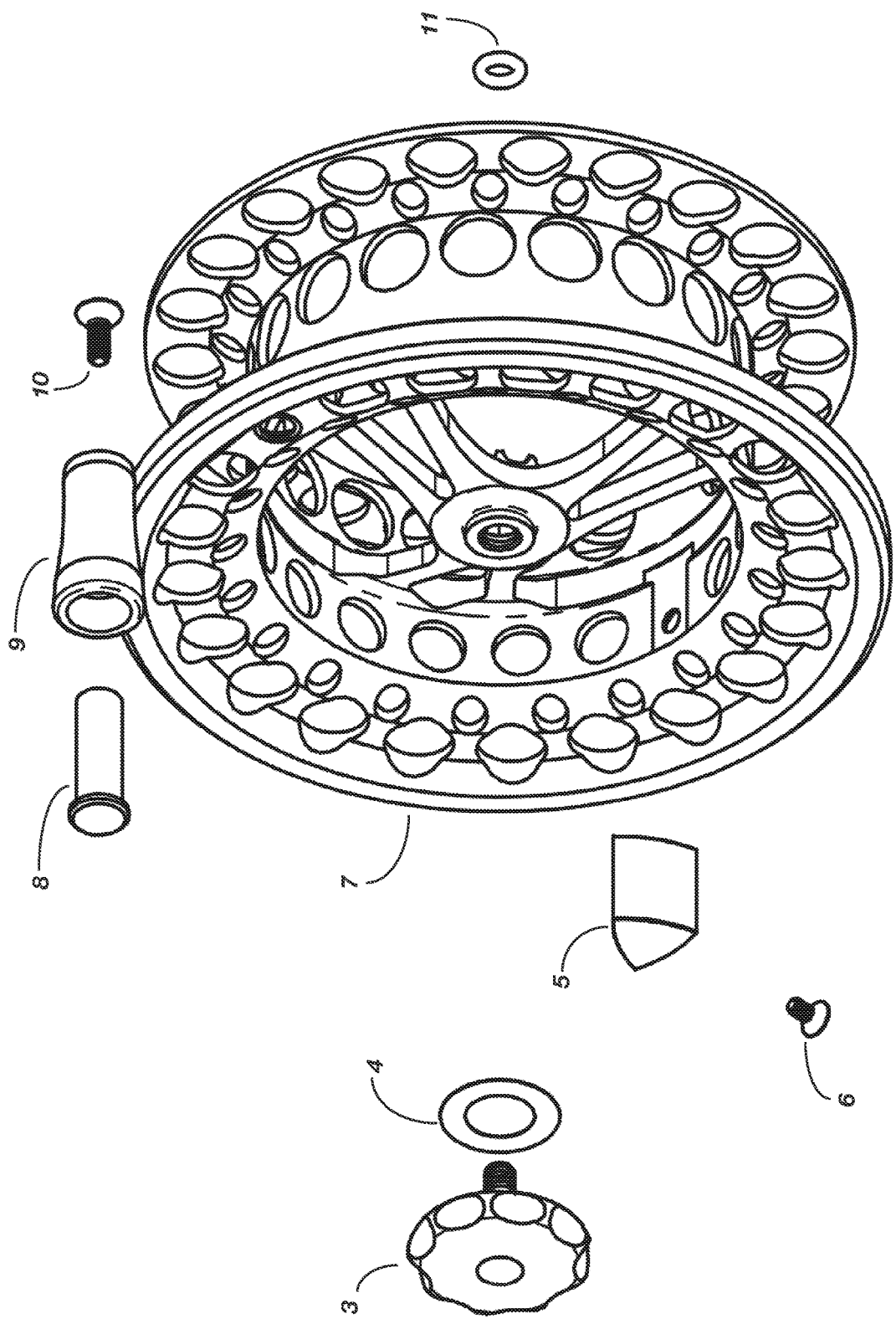
FIG. 2A. Is an exploded view of the spool assembly of the reel. Depicted is the spool screw 3, anti-bind washer 4, counterbalance 5, counterbalance fastener 6, spool 7, handle spindle 8, handle 9, handle spindle fastener 10, and spool screw o-ring 11.
Figure 2B:
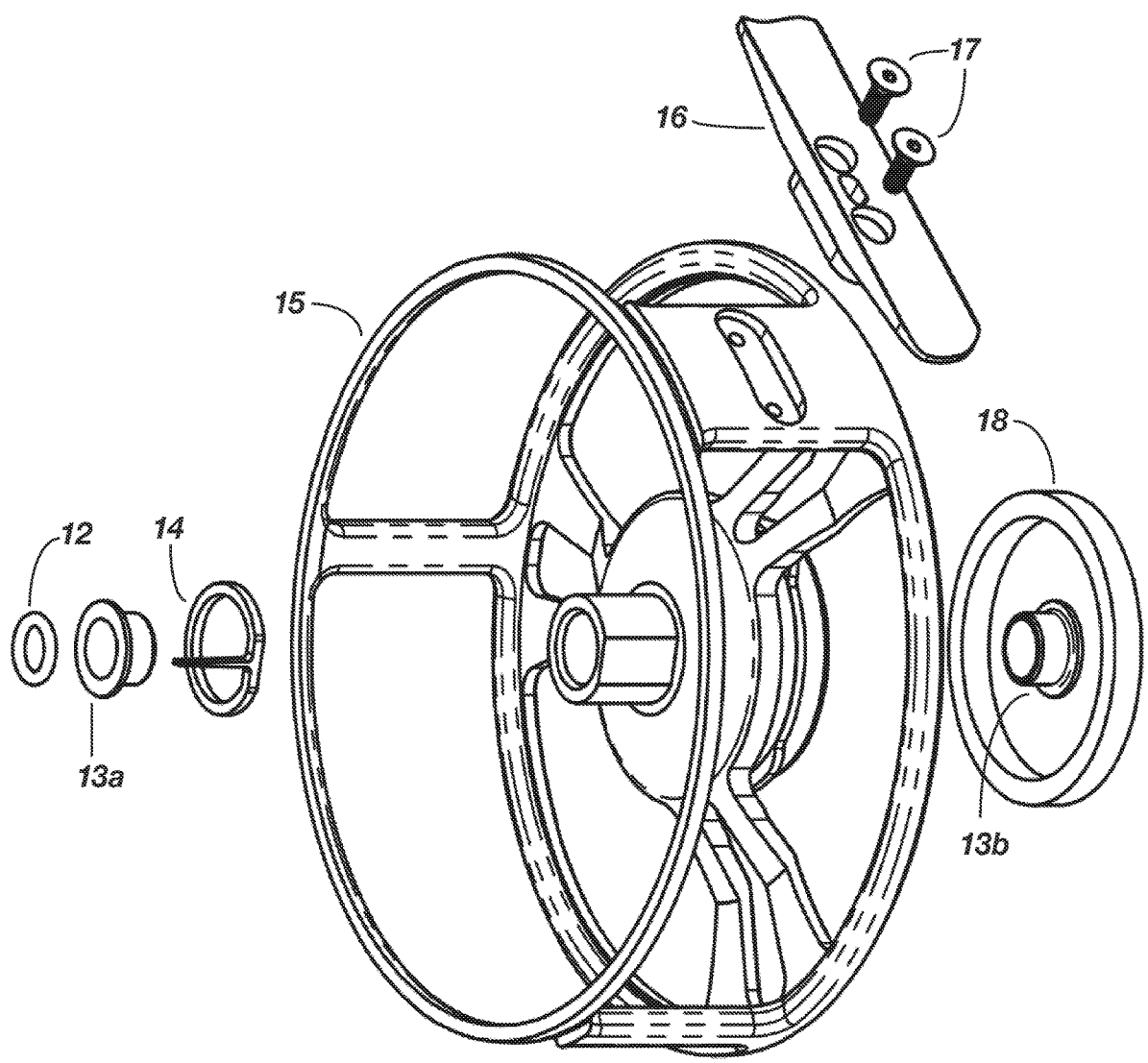
FIG. 2B. Is an exploded view of the Frame assembly of the reel. Depicted is the primary spindle o-ring 12, glide bushings 13a, 13b, spool pawl 14, reel frame 15, reel foot 16, reel foot fasteners 17, and drag gasket 18.

The reel assembly 1 is comprised of the spool assembly FIG. 2A and frame assembly FIG. 2B wherein the spool assembly is attached to the frame assembly and radially supported by the primary spindle 19. The spool assembly is fastened to the primary spindle by the spool screw 3. The spool screw is fixed to the spool via the spool screw o-ring 11, which allows for radial movement of the spool screw and allows for the user to attach and detach the spool assembly FIG. 2A to/from the frame assembly FIG. 2B. During assembly, glide bearings 13a, 13b, are permanently pressed into both ends of the reel spindle shaft 32 and provide stabilization to, and radial movement of the primary spindle 19. The primary spindle is the sole component within the drag components FIG. 3A, which is permanently affixed within the frame assembly FIG. 2B via the primary spindle o-ring 12. The primary spindle retains radial movement and rotates with the spool assembly when fastened to the spool screw.

Figure 3A:
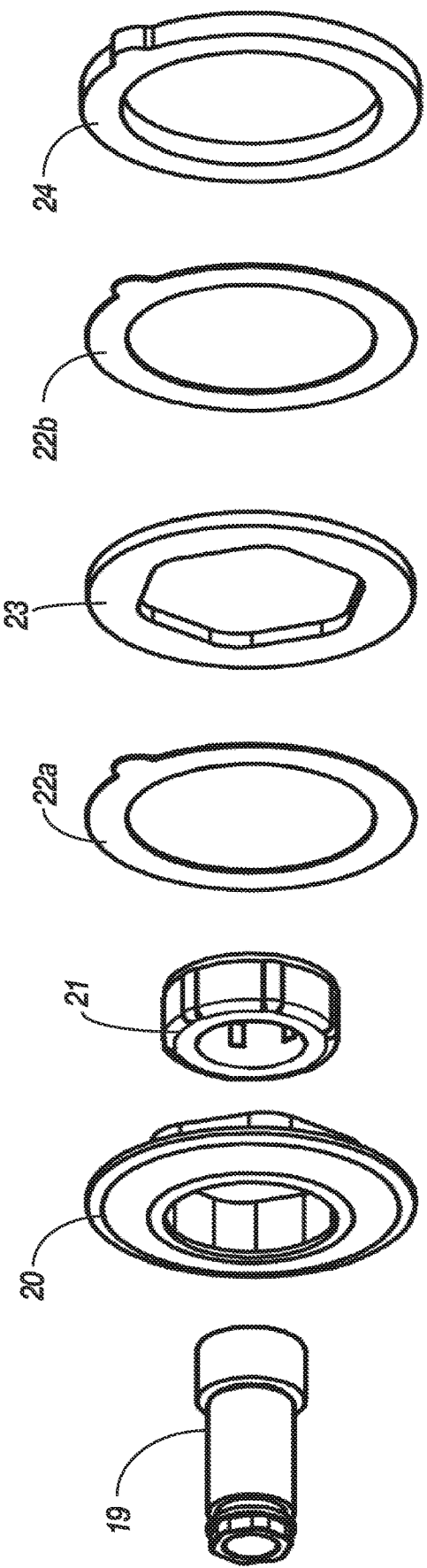
FIG. 3A. Is an exploded view of the loose individual drag components of the reel. Depicted is the primary spindle 19, primary drag disc 20, unidirectional bearing 21, stainless drag washers 22a, 22b, secondary drag disc 23, and drag spring 24.

Upon assembly the drag components FIG. 3A are inserted into the drag system housing 29 portion of the frame assembly FIG. 2B. The primary spindle 19 is firstly inserted into the frame and attached via the primary spindle o-ring 12, in as such as only radial movement is allowed. The primary drag disc 20 is then inserted into the drag housing and fitted around the lower portion of the primary spindle. Stainless discs 22a and 22b are inserted with their tabular features aligning with the key locking channel 39 within the drag housing with the secondary drag disc 23 sandwiched between them. The primary and secondary drag discs are hexagonally keyed to the unidirectional bearing 21, while the stainless discs and drag spring are each keyed into the slot feature 39 of the frame FIG. 6. This creates a stacked disc braking system wherein the primary and secondary drag discs rotate in accordance with the unidirectional bearing 21, wherein the primary drag disc may be compressed between the innermost portion of the drag housing 29 and stainless disc 22a, and the secondary drag disc is compressed between stainless discs 22a and 22b. The unidirectional bearing 21 is then inserted into the hexagonal feature of the primary drag disc, and engages with the outer diameter of the primary spindle 19 within the drag housing. The direction of engagement is interchangeable, and dictates the direction in which the braking force is applied. The unidirectional bearing is easily accessed and flipped as a result of the first preferred embodiment of the invention. Once the drag components FIG. 3A are inserted into the drag housing, the drag knob assembly may be attached to the frame.

Figure 3B:
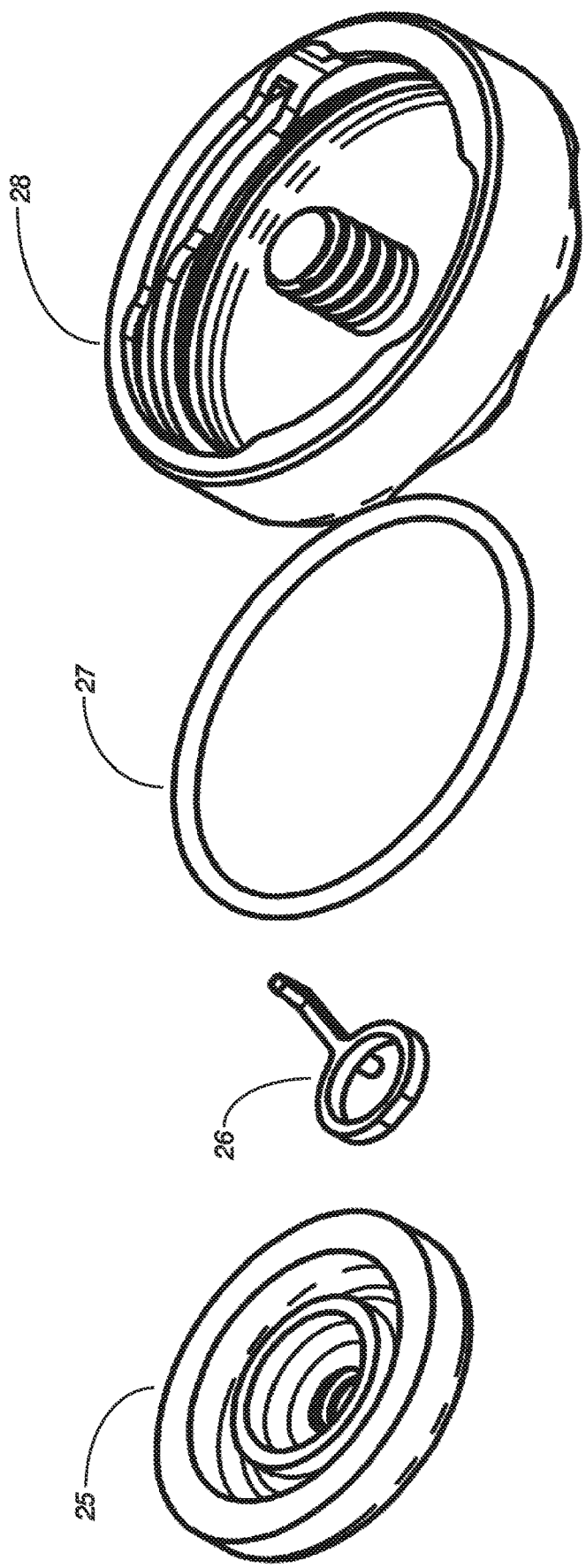
FIG. 3B. Is an exploded view of the drag knob assembly of the reel. Depicted is the pressure plate 25, position pawl 26, drag knob o-ring 27, and drag knob 28.
Figure 4:
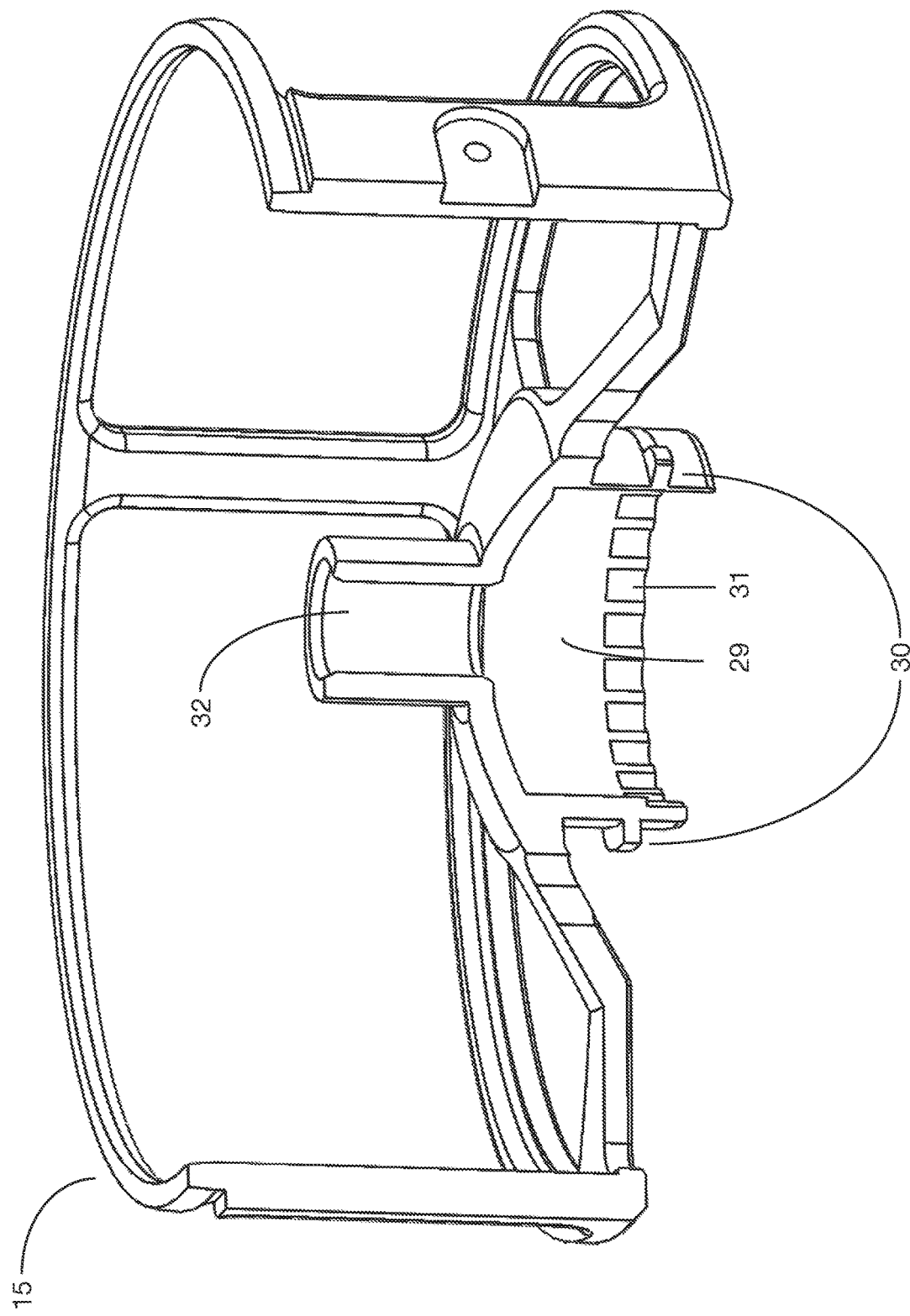
FIG. 4. Is a cross sectional view of the frame 15. The features depicted are machined as a part of the frame and include the drag housing 29, tabular features 30, position pawl indents 31, and the primary spindle shaft 32.
Figure 5:
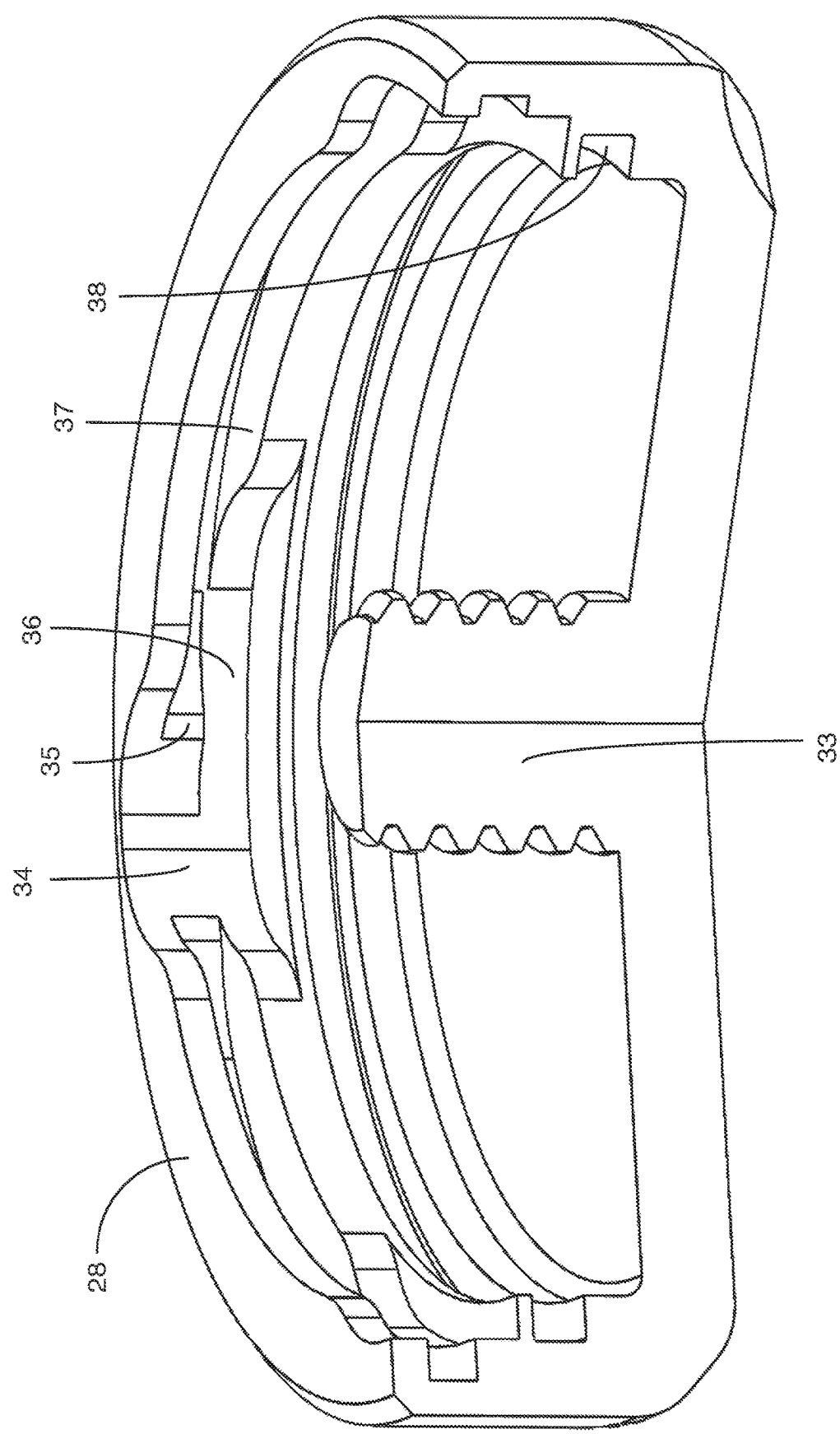
FIG. 5. Is a cross sectional view of the drag knob 28. The features depicted are machined as a part of the drag knob and include the pressure plate screw 33, the release channel 34, hard stop 35, compression channel 36, glide channel 37, and o-ring channel 38.
Figure 6:
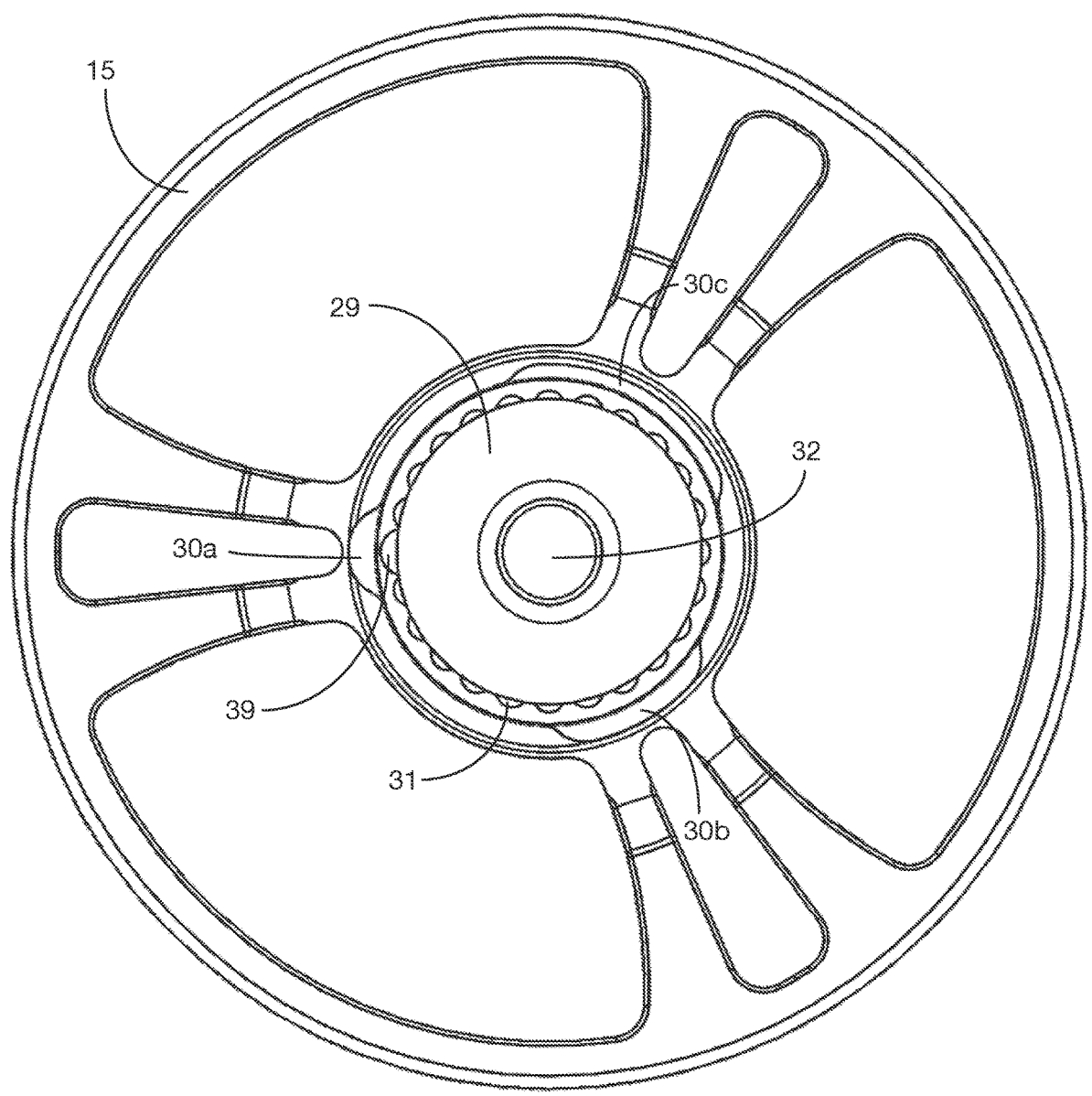
FIG. 6. Is a plan view of the frame of the reel 15. The features depicted are machined as a part of the frame and include the drag housing 29, the primary tab 30a, secondary tab 30b, tertiary tab 30c, position pawl indents 31, primary spindle shaft 32, and key locking channel 39.
Figure 7:
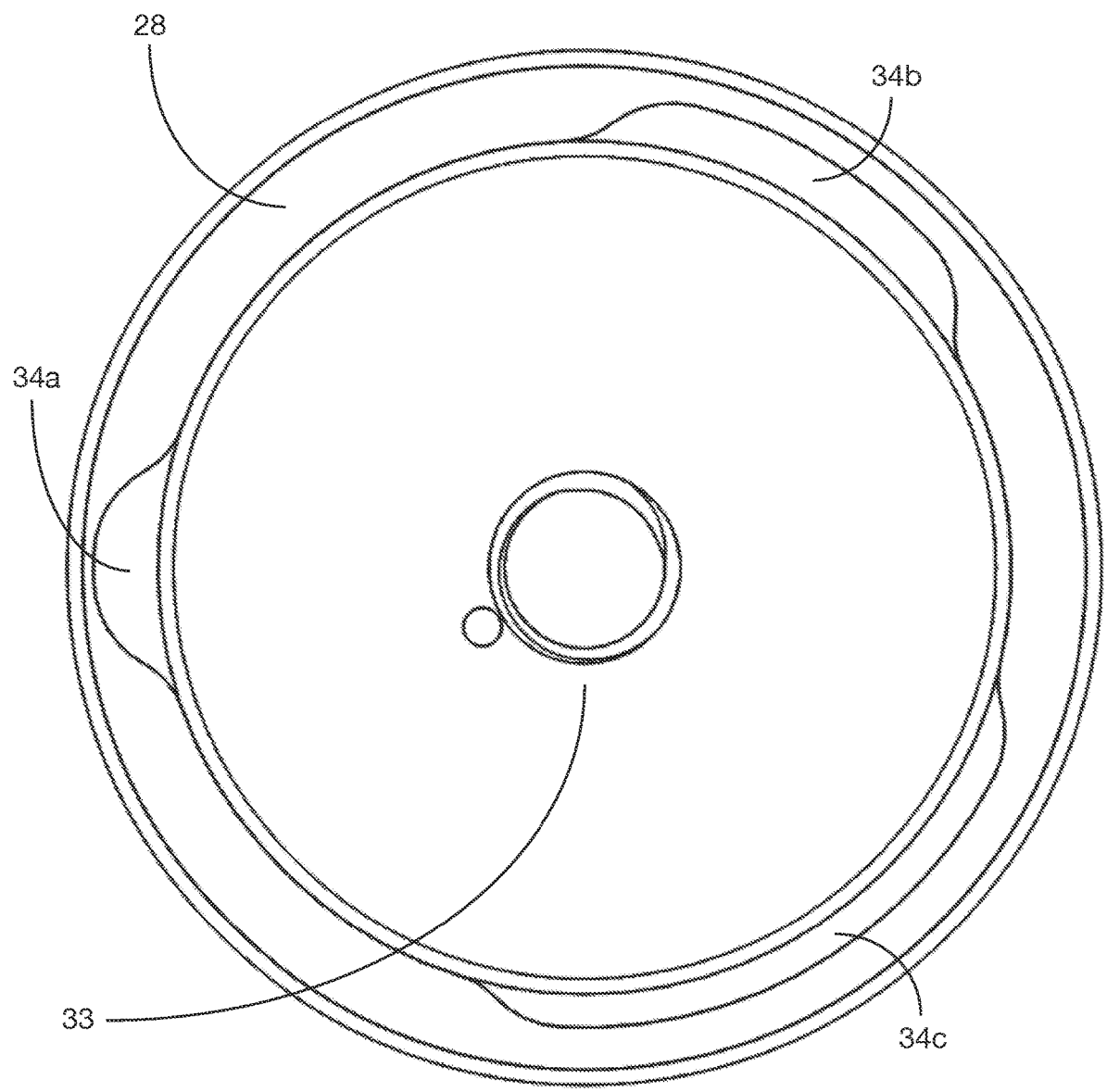
FIG. 7. Is a plan view of the drag knob 28. The features depicted are machined as a part of the frame and include the pressure plate screw 33, primary release channel 34a, secondary release channel 34b, and tertiary release channel 34c.

The drag knob assembly FIG. 3B consists of four components, the drag knob 28, the drag knob o-ring 27, the position pawl 26, and the pressure plate 25. The first preferred embodiment of the invention is facilitated by a tab and channel attachment system. The drag knob assembly may be attached to and released from the frame assembly of the reel via tabular features 30a, 30b, 30c, which are located on the outside diameter of the drag housing 29 portion of the frame 15. These tabs correspond with the channel system machined into the inside diameter of the drag knob 28 seen in FIG. 5. and FIG. 7. Each tab interacts with corresponding release channels 34a, 34b, and 34c, illustrated in FIG. 7. Features 30a, 30b, and 30c protrude from the outer diameter of the drag housing 29 at varying distances and extend for varying distances along the outer diameter of the drag housing in as such as there may only be one attachment and release point for the drag knob assembly. Tab feature 30a protrudes at the greatest distance, and interferes with the hard stop 35. When the tab features are aligned with their corresponding release channels the drag knob 28 may slide onto the frame to a point at which the pressure plate 25 contacts the drag spring 24. At this point the drag spring serves a secondary purpose of facilitating the attachment of the drag knob assembly 2 and the drag knob assembly may be pressed onto the frame 15, until tab feature 30a clears the hard stop 35, at which point the tabs may be rotated through their respective compression channels 36, and past the hard stop 35. At this point the drag spring 24 may decompress and the tabular features will slide into the glide channel 37. Once the tabular features sit within the glide channel the drag knob assembly 2 is effectively locked to the reel and may rotate radially for roughly 350 degrees before tab 30a hits the hard stop 35 and the drag knob may no longer rotate. At this point the maximum drag setting is reached. In order to detach the drag knob this process is simply reversed.

When the drag knob assembly FIG. 3B. is attached to the reel assembly 1, the amount of pressure on the drag spring 24 may be increased or decreased by rotating the drag knob assembly 2. The pressure plate 25 is threaded to the drag knob screw 33, and at the minimum drag setting the slight contact between the pressure plate and drag spring allows for the pressure plate to remain static to the drag spring and rotate freely from the drag knob, applying increasing pressure to the drag spring as the drag knob is rotated clockwise and decreasing pressure as it is rotated counterclockwise towards the minimum drag setting and release point. As the drag spring is compressed, the amount of braking force transmitted to the drag components FIG. 3A, through the reel spindle 19, and to the spool assembly FIG. 2A, effectively increases the tension applied to the fish through the fly line.

The second preferred embodiment of the fly reel is dependent upon the first. This preferred embodiment is the function achieved through the use of an elastomeric drag spring 24, which is interchangeable via removal of the drag knob. The drag spring may be made of silicone, foam, or a variety of materials which exhibit a natural tendency to rebound when compressed, to maintain their shape and structure, and which are available in varying densities. When the drag knob assembly 2 is attached to the reel assembly 1 and set to the minimum drag setting, the pressure plate 25 achieves a slight engagement with the drag components FIG. 3A. By interchanging drag springs 24 of equal size and varying densities or materials, the invention allows for a variety of drag ranges. With varying drag springs of equal thickness applied, the drag range will exhibit a relative minimum braking force, while the maximum braking force achievable will increase or decrease relatively. The present invention therefore allows for the drag system to be specifically tuned to the size of the reel and to the intended target species of the respective reel. As the fly reel assembly 1 increases in size, the size and strength of the intended target species is likely to increase, therefore the density of the drag spring 24 is increased, and the maximum achievable braking force is increased. This is achievable by interchanging the drag spring 25 only, where all other drag components depicted in FIG. 3A remain the same throughout the size range of reels.

The third preferred embodiment is dependent upon the first. As a result of an accessible drag system with free floating drag components FIG. 3A, the configuration of these components may be interchanged. The primary drag disc 20, secondary drag disc 23, and stainless washers 22a and 22b, may be stacked in varying configurations, allowing for less or more total braking surface applied. Users may wish to configure the stack up of drag components FIG. 3A to either decrease braking surface and allow for a lower maximum drag force, desirable for smaller game fish and thinner diameter fishing lines, or to increase the amount of braking surface for larger game species.

The fourth preferred embodiment is dependent upon the first. When attached to the fly reel assembly 1, the drag knob assembly 2 may be rotated in order to adjust the drag settings. This is the primary means of drag adjustment. Regardless of the configuration of drag components 20, 22a, 23, 22b, and 24, the drag will retain the same relative minimum drag setting. Should the user require additional drag strength without altering the configuration of the drag components, the user may remove the drag assembly 2 from the reel assembly 1, and access the pressure plate 25. The pressure plate is seated atop the position pawl 26, threaded to the drag knob screw 33, and may be rotated outwards from its seated position. This is a secondary means of drag adjustment. Once adjusted, the drag knob assembly 2 may be reattached to the reel assembly 1. Once the drag knob assembly is reattached, both the minimum and maximum drag settings are effectively increased in terms of overall braking force applied.

The fifth preferred embodiment is the method of sealing the drag system, which is independent of the previous embodiments. There are two access points for water and elements to enter the drag system, including the spool side of the primary spindle shaft 32 shown in FIG. 4, and the drag knob side of the drag system housing 29. The drag knob o-ring 27 is inserted into the o-ring channel 38 of the drag knob 28 prior to assembly, engaging the outer diameter of the drag housing 29 portion of the frame, providing a secondary seal from the drag knob side. Upon assembly of the frame, the drag knob gasket 18 is fitted around the outer diameter of the drag knob housing 29 between the tabular features 30 and the center of the frame, providing a primary seal from water and elements entering the drag knob side of the drag system. The primary spindle 19 must be sufficiently supported by the frame 15, restricted in axial movement, and allowed to rotate radially when attached to the spool assembly FIG. 2A. Self lubricating hydrophobic glide bearings are pressed into both the interior and exterior openings of the reel shaft and serve the purpose of stabilizing the primary spindle 19, allowing for unrestricted radial movement of the spindle, and providing a secondary seal for water and elements reaching the drag components FIG. 3A. The primary spindle o-ring 12 is fitted to the primary spindle 19, allowing for unrestricted radial movement of the spindle while restricting the axial movement and providing a primary seal to the drag components through its contact on the surface of the outer glide bearing. Two-point sealing systems on both sides of the drag system effectively fend off water and elements, allowing for minimal maintenance required within the drag system.

What is claimed is:

1. A fly fishing reel comprising:
A frame assembly, a drag knob assembly, a channel locking system, and drag components including a spring mechanism; wherein the channel locking system facilitates the tool-free attachment/detachment of the drag knob assembly to the frame assembly at a single point within a 360 degree rotation; at which point the spring mechanism must be compressed to allow for release and attachment of the drag knob assembly to the frame assembly.

2. A fly fishing reel comprising:
A frame assembly, a spool assembly, a drag knob assembly, and drag components consisting of discs, washers, a spring, a pressure plate, a clutch mechanism, and a spindle; wherein the drag components are contained between the frame assembly and the drag knob assembly, on the opposite side of the frame of the spool assembly; wherein brake force is increased or decreased via the radial adjustment of the drag knob assembly; wherein the drag knob facilitates axial movement of the pressure plate, transmitting varying levels of pressure to the drag spring, drag discs, and drag washers; wherein the drag washers contain the clutch mechanism, transmitting unidirectional braking force through the spindle to the spool assembly.

* * * * *